BOLOMETER

Filed Nov. 27, 1962

INVENTOR.

Joseph T. McNaney

United States Patent Office 3,106,692
Patented Oct. 8, 1963

3,106,692
BOLOMETER

Joseph T. McNaney, 8548 Boulder Drive, La Mesa, Calif.

Filed Nov. 27, 1962, Ser. No. 240,241
7 Claims. (Cl. 338—18)

This invention relates to an improvement in infrared responsive recorder means wherein infrared radiation is exposed to a sheet of reproducible data and from which is derived reradiation which is converted to an electrostatic polarization of a record medium to provide a copy of the reproducible data.

In my improvement in infrared responsive recorder means I utilize novel heat conductor means intermediate the reproducible data and the record medium which is designed to transfer reradiation from the data to a layer of heat sensitive variable resistance material for controlling the application of an electrostatic polarizing potential to the surface of the record medium. If, for example, the data is in the form of typewritten matter on a sheet of paper an electrostratic latent image of the typewritten matter will be established on the surface of the record medium. Electrostatic image development means, which are well known in the art, will then be utilized to develop and thereby make visible the latent image.

The heat conductor means of my invention is capable of detecting infrared radiation being emitted from extremely small areas of the typewritten matter and allowing such areas to be reproduced on the record medium, as latent images, through the use of heat sensitive variable resistance material intimately joined therewith; the resistance material performing the function of a polarizing voltage switch. The heat conductor means includes a plurality of infrared conducting fibers of arsenic trisulfide, with a chemically related arsenic sulfide glass jacketing each of the fibers, arrayed in a side-by-side relationship extending from one side of the record medium to the other. These fibers each have a predetermined index of refraction and their jacket material has an index which is less than that of the fibers. The fiber and jacket are drawn together, down to diameters of one- or two-thousandths of an inch, for example, in order to provide an extremely important fire-polished, contamination-free, interface between the two materials. These arsenic trisulfide fibers are then capable of conducting wavelengths in the infrared range, measuring between 1 and 8 microns, with a high degree of efficiency.

In addition to the objects and advantages aforestated, it is an object of this invention to provide an improved recorder means which converts infrared radiation into electrical energy to permit the electrical energy to be utilized subsequently for record making purposes.

It is another object of this invention to provide an improved light radiation to electrical energy converter means responsive to infrared which is simple in construction, positive in operation, and trouble-free in continued use.

It is another object of this invention to provide an infrared radiation to electron converter which utilizes an array of optical elements capable of transmitting heating effects of infrared to a layer of heat responsive variable resistance material with a high degree of efficiency and sensitivity.

It is still another object of this invention to provide an exceptionally compact recorder means which utilizes inexpensive record media.

Other objects and advantages will appear hereinafter as a description of the invention proceeds.

The novel features that are considered characteristic of this invention are set forth with particularity in the appended claims. The invention itself, both as to its originality and method of operation, and additional objects and advantages, will best be understood from the following description when read in connection with the accompanying drawing in which:

Figures 1, 2, 3, 4, 5:
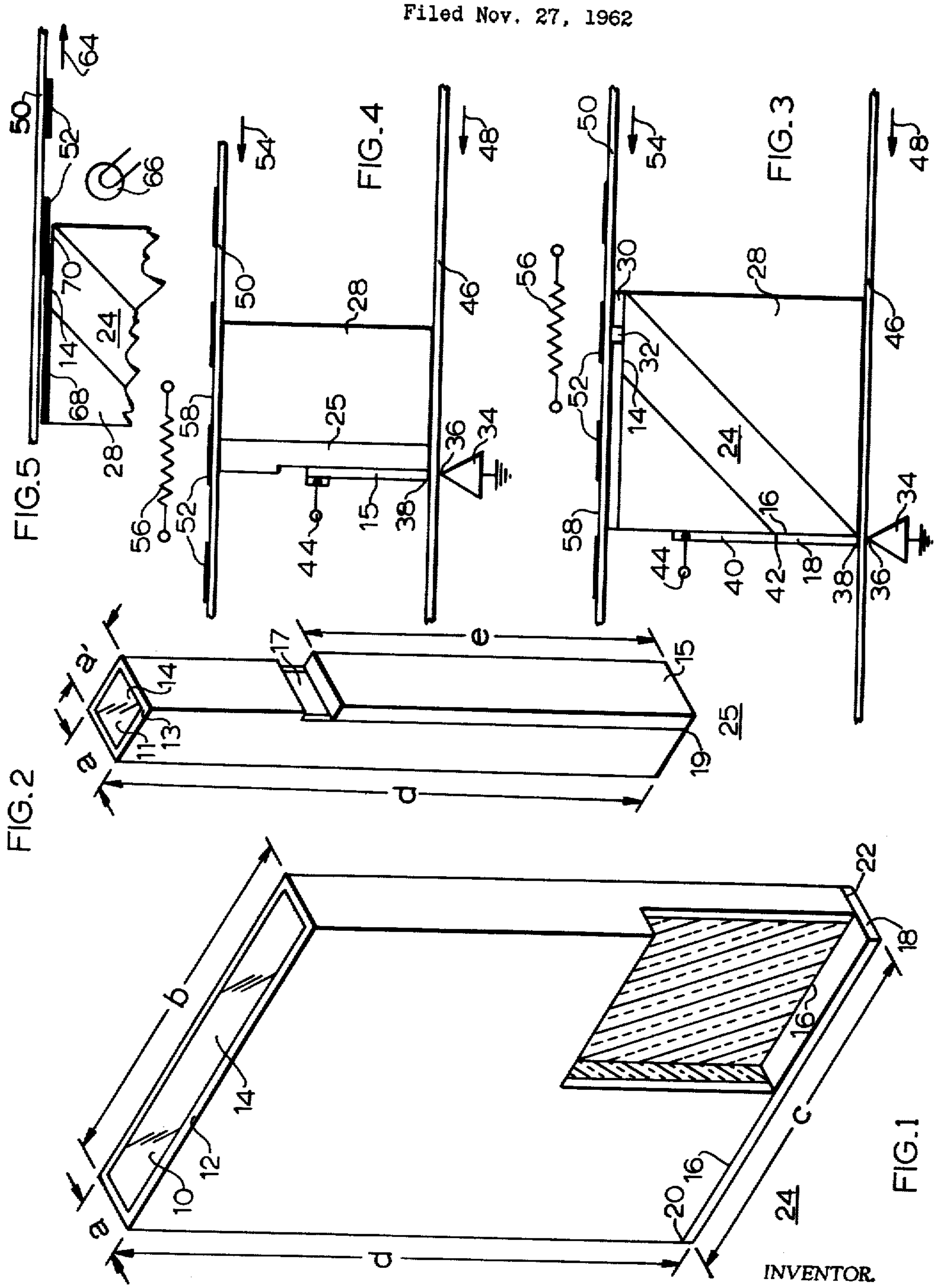
FIGURE 1 is a view in perspective, partially sectional, of a unitary heat conductor for utilization in my infrared responsive recorder means.
FIGURE 2 is a view in perspective of another embodiment of a unitary heat conductor for utilization in my infrared responsive recorder means.
FIGURE 3 is a diagrammatic representation of a system embodiment of the recorder means of this invention.
FIGURE 4 is a diagrammatic representation of another system embodiment of the recorder means of this invention.
FIGURE 5 is a diagrammatic representation of a portion of still another embodiment of this invention relating to infrared radiation control means.

Referring now to FIGURE 1, I have shown therein a unitary heat conductor being comprised of a first infrared conductor 10, jacketed by a second infrared conductor 12, extending from a first end 14 to a second end 16 of said conductor 10. There is also a layer 18 of infrared sensitive photoconductor material disposed upon and intimately joined with the second end 16 of the jacketed conductor 10, extending from a first edge 20 to a second edge 22. The first conductor 10 is a fiber-like material, such as arsenic trisulfide glass, capable of transmitting infrared frequencies, within a jacket 12 of a chemically related material, such as arsenic sulfide glass having a lower index of refraction than that of the first conductor 10. As hereinbefore stated, the fiber-like material 10 and the jacket 12 are drawn down to very small cross sectional dimensions, and of almost any desired cross sectional shape. These materials being drawn together whereby the interface between them will be of a fire-polished smoothness and contamination-free.

Insofar as the dimensions of the structure of FIGURE 1 are concerned, the width *a*, and the length *b*, of the first end 14 surface and the second end 16 surface are of the utmost importance to the invention, as well as the longitudinal dimension *d*. The width dimension *a* is important insofar as the high density information requirements of the invention are concerned, and the length dimension *b* is important in that the second end 16 surface is required to support a layer of infrared sensitive material 18 having a predetermined dimension *c*, extending from the first edge 20 to the second edge 22 of the device 24. The width *a*, for example, can be as little as 0.001", the length *b* can be much as 0.100", if necessary, and the length of the layer 18 extended to as much as 0.100". The longitudinal dimension *d* of the device 24 can be as long as one inch or more, depending upon design requirements of the recorder means of this invention.

The infrared responsive variable resistance device 24, described thus far, is designed to have a longitudinally extending layer 18 of infrared radiation sensitive photoconductor material, such as lead sulfide, lead selenide, germanium, zinc sulfide, cadmium sulphide, or combinations of such materials, either in their pure state or in a modified state, having a predetermined electrical resistance along its longitudinal dimension *c*. The layer 18 is intimately joined with the second end 16 surface of the device 24 which has a longitudinally dimensioned first infrared conductor means 10 for conducting heating effects of the infrared radiation to the layer 18 uniformly and extending from the first edge 20 to the second edge 22. The infrared conductor means has a predetermined index of refraction and is jacketed with a second infrared conductor means 12. This second conductor means 12 is intimately joined with the first conductor means 10 along its longitudinal dimension *d*, extending from the first end 14 to the second end 16, and has an index of refraction less than the predetermined index of the first conductor means 10, for controlling the reflection of the heating effects through the first conductor means 10 and to the layer 18. Heating effects being absorbed by the layer 18 will modify the thermal state and the predetermined electrical resistance of the layer intermediate the first and second edges 20 and 22.

In the FIGURE 2 embodiment I show another form of heat conductor which includes the same three types of elements that are used in the construction of the FIGURE 1 embodiment, namely, a first infrared conductor means 11, a second infrared conductor means 13, and a longitudinally extending layer 15 of infrared sensitive photoconductor material. The embodiments of FIGURES 1 and 2 differ from one another primarily in the manner in which the layer 15 is supported on the surface 17 of the first conductor means 11. The device 25 has a width dimension *a* which is related to the high density information requirements of the invention which may be as small as 0.001″, and a length dimension *a′* which can vary from 0.001″ to 0.100″, if necessary, insofar as the fabrication requirements of the device 25 are concerned, and a longitudinal dimension *d* which can be up to one inch, or greater, depending upon design and fabrication needs. The object of the device 25, however, is the same as that of the device 24 in that it utilizes a second infrared conductor means 13 intimately joined with a first infrared conductor means 11 along its longitudinal dimension *d* for controlling the reflection of infrared radiation through the first conductor means 11 and to the layer 15 for the purpose of modifying the thermal state of the layer 15 and also the predetermined electrical resistance along a longitudinal dimension *e* thereof.

A portion of the jacket 13 has been removed from the first conductor 11 so as to leave an exposed surface 17 extending along the longitudinal dimension *d* of the conductor 11, so that the layer 15 can be disposed upon and intimately joined therewith, and extending to the second end 19 of the device 25. Infrared radiation, upon entering the first end 14, will be allowed to illuminate the layer 15 along its longitudinal dimension *e*.

Referring now to FIGURE 3, the diagrammatic presentation of one embodiment of the recorder means of this invention is shown to include the use of the device 24 hereinbefore described and illustrated in FIGURE 1. A plurality of devices 24 can be placed side-by-side whereby 0.001″ wide devices 24 can be aligned and supported on center-to-center spacings of approximately 0.001″. Such an array is illustrated as being held together in a support material 28 and machined so that a first end 14 of the array is displaced essentially 90° with respect to the second end 16 of the array. A layer of infrared responsive material 18 is disposed upon the second end 16, and an infrared mask 30 is supported on the first end 14 having an aperture therein extending from one end of the array of devices 24 to the other. The aperture 32 can have a width dimension, for example, of 0.001″. This would leave an opening of 0.001″ x 0.001″ adjacent the first end 14 of each device 24 for the passage of infrared radiation therethrough.

An electrode 34, preferably wedge-shaped, and having a thin edge 36, is adjacent one end 38 of the layer 18 and spaced apart therefrom. An electrical conductor 40 is operatively connected to the opposite end 42 of the layer 18, and provided with a terminal 44. Intermediate the one end 38 of the layer 18 and the thin edge 36 of the electrode 34, there is a record medium 46 which is capable of being electrostatically charged and moved in the direction of the arrow 48. A source of polarizing potential will be presented to the terminal 44 and the electrode 34, which is at ground potential. When in an initial low thermal state and presenting a predetermined electrical resistance between the one end 38 and the opposite end 42, the potential will appear across the layer 18. However, when the layer 18 is exposed to infrared radiation the predetermined electrical resistance will be modified and thereby allow the influence of the polarizing potential to be extended to the record medium 46, intermediate the opposite end 38 of the layer 18 and the electrode 34.

A sheet of reproducible data 52 on surface 58 is supported adjacent the mask 30 and aperture 32, and capable of being moved in the direction of arrow 54. A source 56 of infrared radiation is adjacent the aperture 32 and in a position whereby the data 52 will be exposed to and adapted to receive infrared radiation therefrom. The reproducible data 52 can be a carbon-like material on the surface 58 of the sheet 50, capable of absorbing infrared radiation, and reradiation therefrom will penetrate the thickness of the sheet 50 to enter the aperture 32 and the first end 14 of devices 24. The reproducible data 52 may, of course, be printed matter, written matter, or typewritten matter, on bond paper of weights ranging from 9 lb. to 14 or 16 lb.

Reradiation from predetermined areas 52 of heat sensitive materials, incident to the end 14 surfaces of one or more devices 24 will be conducted through the infrared conductor 10 to the layer of heat sensitive photoconductor material 18 as hereinbefore set forth. The polarizing potential means, including the layer 18 and the electrode 34, will then be utilized in effecting electrostatic latent images on the record medium 46. Latent images established thereon will then be developed by any one of a number of well known electrostatic charge developing techniques.

The diagrammatic presentation of a second system embodiment of the recorder means of this invention, shown in FIGURE 4, utilizes a plurality of devices 25 illustrated in FIGURE 2. The operation of this embodiment is the same as that of FIGURE 3. If the width *a* and the length *a′* of the device 25 are both equal to 0.001″, it can be assumed that the surface area through which infrared radiation may enter will be equal to that of the FIGURE 3 embodiment, wherein the limiting aperture 32 is utilized. Therefore, a mask 30 will not be required in the FIGURE 4 embodiment. However, if the length dimension *a′* of the device 25 is extended beyond that indicated there may then be an advantage in using a mask 30 with an aperture 32 as a means of achieving a satisfactory figure of resolution in the recorded image.

The infrared radiation control means includes a sheet of reproducible data 52 on the surface 58 of the sheet 50, intermediate the primary source 56 of radiation and the first ends 14 of the array of devices 25. The discrete areas 52 of heat sensitive material will receive radiant energy from the primary source 56 and thereupon transmit a corresponding temperature to the heat conductor of the device 25. As the sheet 50 is moved in the direction of the arrow 54, reradiation from the discrete areas 52 will be a function of sheet 50 position. Since the record medium 46 will be moved in the same direction a copy of the data on sheet 50 will be transferred to the medium 46 in the form of an electrostatic latent image.

Referring now to the FIGURE 5 diagrammatic presentation of a portion of still another recorder means of this invention, this embodiment represents a modification of the system as illustrated in FIGURE 3. Differences will be noted in the fact that the sheet 50 of discrete areas 52 of data is to be moved in a reverse direction 64, and the areas 52 of heat sensitive material are facing the first end 14 of the devices 24. A primary source 66 of infrared radiation is positioned below the sheet 50 whereby the areas 52 will be exposed directly to the source 66. An infrared mask 68 is designed to shield the first end 14 from reradiation from the areas 52, except for a predetermined aperture-like portion 70 of the first end 14. The width of this aperture 70 will be 0.001″ or less. Instead of reradiation having to pass through the thickness of the sheet 50, reradiation from areas 52 will enter the aperture 70 directly. This, of course, is an advantage over the previous embodiments since the weight of the medium is less critical.

Although the sheet 50 is shown as being movable in the direction of the arrow 64, the only requirement in this regard is that the sheet shall be moved in a direction opposite to that of the record medium 46. Sheet 50 can, therefore, be moved in the direction opposite to that of arrow 64, provided the record medium 46 is made to move in the direction opposite to arrow 48. Under these conditions a positive copy of data 52 will be transferred to the medium 46 in the form of a latent image.

The FIGURE 5 recorder means is a preferred embodiment of the invention since it is possible to have recorded or reproducible data 52 on opposing surfaces of the sheet 50 without one surface of data interfering with the other during the process of making a copy therefrom.

Although I have limited myself to the showing of these embodiments of the invention, it should be understood by those skilled in the arts that the invention is not limited in this regard since many of the other embodiments embracing the general principles and constructions hereinbefore set forth may be utilized, and still be within the ambit of the present invention.

The particular embodiments of the invention illustrated and described herein is illustrative only, and the invention includes such other modification and equivalents as may readily appear to those skilled in the arts, and within the scope of the appended claims.

I claim:

1. An infrared responsive photoelectric device comprising:
   (*a*) a layer of infrared sensitive photoconductive material;
   (*b*) an infrared conductive core, having a predetermined index of refraction, for supporting said layer and conducting infrared radiation to said layer; and
   (*c*) an infrared conductive jacket, having an index of refraction less than said predetermined index, disposed upon and intimately joined with said core for controlling the reflection of said radiation through said core and the reflection of said radiation to said layer.

2. An infrared responsive photoelectric device comprising:
   (*a*) a layer of infrared sensitive photoconductive material;
   (*b*) an infrared conductive core, having a predetermined index of refraction and a longitudinal dimension exceeding its cross-sectional dimension, and presenting an outer surface generally along its longitudinal dimension;
   (*c*) an infrared conductive jacket, having an index of refraction less than said predetermined index, disposed upon and intimately joined with a predetermined portion of said outer surface so as to leave an uncoated portion of said outer surface extending generally along said longitudinal dimension;
   (*d*) said layer disposed upon and intimately joined with at least a portion of said uncoated portion of said outer surface; and
   (*e*) said jacket being adapted to provide reflection of infrared radiation presented thereto through said core and to said layer.

3. An infrared responsive photoelectric device comprising:
   (*a*) a layer of infrared sensitive photoconductive material;
   (*b*) an infrared conductive core, having a predetermined index of refraction, a longitudinal dimension exceeding its cross-sectional dimension and first and second transverse ends;
   (*c*) an infrared conductive jacket, having an index of refraction less than said predetermined index, disposed upon and intimately joined with said core generally along said longitudinal dimension;
   (*d*) said layer disposed upon and intimately joined with said second transverse end; and
   (*e*) said jacket being adapted to control the reflection of infrared radiation from said first transverse end through said core and to said layer.

4. An infrared responsive photoelectric device comprising:
   (*a*) a layer of infrared sensitive photoconductive material;
   (*b*) an infrared conductive core, having a predetermined index of refraction, for supporting said layer and conducting infrared radiation to said layer;
   (*c*) an infrared conductive jacket disposed upon and intimately joined with said core so as to leave a first surface through which infrared radiation will enter said core and a second surface through which said radiation may leave said core;
   (*d*) said layer disposed upon and intimately joined with at least a portion of said second surface; and
   (*e*) said jacket having an index of refraction less than said predetermined index for controlling the reflection of infrared radiation through said core upon entering said first surface and the reflection of said radiation to said layer.

5. An infrared responsive photoelectric device comprising:
   (*a*) an infrared conductive core having a predetermined index of refraction;
   (*b*) an infrared conductive jacket, having an index of refraction less than said predetermined index, disposed upon and intimately joined with said core so as to leave a first surface through which infrared radiation may enter said core and a second surface through which said radiation may leave said core;
   (*c*) infrared sensitive photoconductive material, having first and second terminals, adjacent the second surface of said core and adapted to receive infrared radiation intermediate said first and second terminals from said second surface;
   (*d*) means for presenting the influence of an electrical potential between the first and second terminals of said photoconductive material;
   (*e*) said jacket being adapted to provide the reflection of infrared radiation said core from said first surface to said second surface, and the reflection of said radiation to said photoconductive material; and
   (*f*) means for deriving a flow of electrons from said electrical potential upon the reflection of radiation from said jacket to said photoconductive material.

6. An infrared responsive photoelectric device comprising:
   (*a*) an infrared conductive optical fiber, having a predetermined index of refraction, a longitudinal dimension exceeding its cross-sectional dimension and first and second ends;
   (*b*) a layer of infrared conductive material disposed upon and intimately joined with said fiber generally along said longitudinal dimension and having an index of refraction less than said predetermined index for controlling the reflection of infrared radiation through said fiber from said first end to said second end;
   (*c*) a layer of infrared sensitive photoconductive material adjacent said second end and adapted to receive the influence of infrared radiation reflected through said fiber under the control of said layer of infrared conductive material;
   (*d*) means for presenting the influence of an electerial; and
   (*e*) means for deriving a flow of electrons from said electrical potential upon the reflection of infrared radiation from said layer of infrared conductive material to said photoconductive material.

7. An infrared responsive photoelectric device comprising:

(a) an infrared conductive optical fiber, having a predetermined index of refraction, a longitudinal dimension exceeding its cross-sectional dimension, first and second transverse ends and an outer surface generally along its longitudinal dimension;

(b) infrared sensitive photoconductive material, having first and second terminals, disposed upon and intimately joined to the second transverse end of said fiber;

(c) said fiber being adapted to conduct infrared radiation to said photoconductive material intermediate said first and second terminals;

(d) means for presenting the influence of an electrical potential between said first and second terminals;

(e) a jacket of infrared conductive material disposed upon and intimately joined with the outer surface of said fiber, extending from said first to said second transverse end, for controlling the reflection of infrared radiation through said fiber and reflection of infrared radiation to said photoconductive material to provide a flow of electrons within said photoconductive material corresponding to the reflection of infrared radiation to said photoconductive material.

References Cited in the file of this patent

UNITED STATES PATENTS

| | | |
|---|---|---|
| 2,742,550 | Jenness | Apr. 17, 1956 |
| 2,844,493 | Schlosser | July 22, 1958 |
| 2,883,292 | Jerger | Apr. 21, 1959 |
| 2,958,778 | Miller et al. | Nov. 1, 1960 |
| 3,048,695 | Russell | Aug. 7, 1962 |
| 3,076,949 | Anderson | Feb. 5, 1963 |
| 3,082,392 | McLean | Mar. 19, 1963 |

UNITED STATES PATENT OFFICE

CERTIFICATE OF CORRECTION

Patent No. 3,106,692 October 8, 1963

Joseph T. McNaney

It is hereby certified that error appears in the above numbered patent requiring correction and that the said Letters Patent should read as corrected below.

Column 6, lines 69 and 70, strike out "electerial" and insert instead -- electrical potential across said photoconductive material --.

Signed and sealed this 13th day of October 1964.

(SEAL)
Attest:

ERNEST W. SWIDER
Attesting Officer

EDWARD J. BRENNER
Commissioner of Patents